United States Patent
Wada et al.

(10) Patent No.: US 10,891,398 B2
(45) Date of Patent: Jan. 12, 2021

(54) ELECTRONIC APPARATUS AND METHOD FOR OPERATING A VIRTUAL DESKTOP ENVIRONMENT FROM NONVOLATILE MEMORY

(71) Applicant: Toshiba Client Solutions CO., LTD., Tokyo (JP)

(72) Inventors: Kouetsu Wada, Tokyo (JP); Kyohei Matsuda, Tokyo (JP); Tsukasa Nunami, Tokyo (JP); Kohei Momosaki, Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 517 days.

(21) Appl. No.: 15/387,442

(22) Filed: Dec. 21, 2016

(65) Prior Publication Data

US 2017/0185530 A1 Jun. 29, 2017

(30) Foreign Application Priority Data

Dec. 25, 2015 (JP) ................... 2015-253855

(51) Int. Cl.
*G06F 21/80* (2013.01)
*G06F 21/53* (2013.01)
(Continued)

(52) U.S. Cl.
CPC ............ *G06F 21/80* (2013.01); *G06F 9/4416* (2013.01); *G06F 21/53* (2013.01); *G06F 21/34* (2013.01); *H04L 63/12* (2013.01)

(58) Field of Classification Search
None
See application file for complete search history.

(56) References Cited

U.S. PATENT DOCUMENTS 6,151,674 A 11/2000 Takatani
7,844,810 B2 11/2010 Takahashi
(Continued)

FOREIGN PATENT DOCUMENTS

JP H11-203241 A 7/1999
JP H11-249900 A 9/1999
(Continued)

OTHER PUBLICATIONS

Kazuhiro Goto et al., "A study on boot time for HTTP-FUSE KNOPPIX using cached split-and-compressed block files", Proceedings of the 69th (2007) National Convention (3), Information Processing Society of Japan, Mar. 6, 2007, pp. (3-49)-(3-50).
(Continued)

*Primary Examiner* — Lewis A Bullock, Jr.
*Assistant Examiner* — Gilles R Kepnang
(74) *Attorney, Agent, or Firm* — Knobbe, Martens, Olson & Bear, LLP

(57) ABSTRACT

According to one embodiment, an electronic apparatus includes a nonvolatile memory and a hardware processor. The nonvolatile memory is configured not to permit a user using the electronic apparatus to access the nonvolatile memory. The hardware processor is configured to download a client program for connection to a first server apparatus configured to provide a virtual desktop environment, from a second server apparatus different from the first server apparatus, make the downloaded client program stored in the nonvolatile memory, and launch the client program stored in the nonvolatile memory in order for the electronic apparatus to receive the virtual desktop environment, in a case where the client program is stored in the nonvolatile memory.

5 Claims, 8 Drawing Sheets

(51) Int. Cl.
*G06F 9/4401* (2018.01)
*G06F 21/34* (2013.01)
*H04L 29/06* (2006.01)

(56) References Cited

U.S. PATENT DOCUMENTS

| | | | | |
|---|---|---|---|---|
| 9,055,139 | B1* | 6/2015 | Devireddy | H04L 67/42 |
| 2003/0079045 | A1* | 4/2003 | Bender | H04L 29/06 |
| | | | | 709/251 |
| 2004/0003037 | A1* | 1/2004 | Fujimoto | G06Q 10/107 |
| | | | | 709/203 |
| 2005/0246518 | A1 | 11/2005 | Takahashi | |
| 2006/0031826 | A1* | 2/2006 | Hiramatsu | G06F 21/57 |
| | | | | 717/168 |
| 2006/0059375 | A1 | 3/2006 | Ooshima et al. | |
| 2006/0253620 | A1* | 11/2006 | Kang | G06F 3/0623 |
| | | | | 710/36 |
| 2007/0157016 | A1* | 7/2007 | Dayan | G06F 9/4416 |
| | | | | 713/2 |
| 2008/0010243 | A1* | 1/2008 | Weissman | G06F 17/30424 |
| 2008/0141042 | A1* | 6/2008 | Lo | G06F 21/10 |
| | | | | 713/193 |
| 2008/0162785 | A1* | 7/2008 | LaPedis | G06F 21/53 |
| | | | | 711/103 |
| 2008/0172555 | A1* | 7/2008 | Keenan | G06F 9/4406 |
| | | | | 713/2 |
| 2010/0005150 | A1 | 1/2010 | Kubota et al. | |
| 2011/0283342 | A1* | 11/2011 | Yamada | G06F 21/79 |
| | | | | 726/4 |
| 2012/0084544 | A1* | 4/2012 | Farina | H04L 63/12 |
| | | | | 713/2 |
| 2013/0007465 | A1* | 1/2013 | Movassaghi | G06F 21/34 |
| | | | | 713/186 |
| 2013/0136125 | A1* | 5/2013 | Jain | H04L 47/38 |
| | | | | 370/392 |
| 2013/0326081 | A1* | 12/2013 | Katz | H04L 65/608 |
| | | | | 709/231 |
| 2014/0109076 | A1* | 4/2014 | Boone | G06F 8/65 |
| | | | | 717/170 |
| 2014/0317394 | A1* | 10/2014 | Buhler | G06F 9/4416 |
| | | | | 713/2 |
| 2014/0325215 | A1* | 10/2014 | Wright | G06F 7/588 |
| | | | | 713/165 |
| 2016/0006765 | A1* | 1/2016 | Shem Tov | H04L 63/20 |
| | | | | 726/1 |
| 2016/0044046 | A1* | 2/2016 | Boone | G06F 8/65 |
| | | | | 726/1 |
| 2016/0105429 | A1* | 4/2016 | Boenisch | H04L 63/0853 |
| | | | | 713/171 |

FOREIGN PATENT DOCUMENTS

| | | |
|---|---|---|
| JP | 2005-316809 A | 11/2005 |
| JP | 2006-079449 A | 3/2006 |
| JP | 2006-139489 A | 6/2006 |
| JP | 2009-258922 A | 11/2009 |
| JP | 2010-182260 A | 8/2010 |
| JP | 2013-141256 A | 7/2013 |
| JP | 2015-109008 A | 6/2015 |

OTHER PUBLICATIONS

"Thin Client Safety Enhancement Measures Realized by Toshiba's Proprietary BIOS", NIKKEI Computer (No. 885), Apr. 30, 2015, pp. 58-59.

* cited by examiner

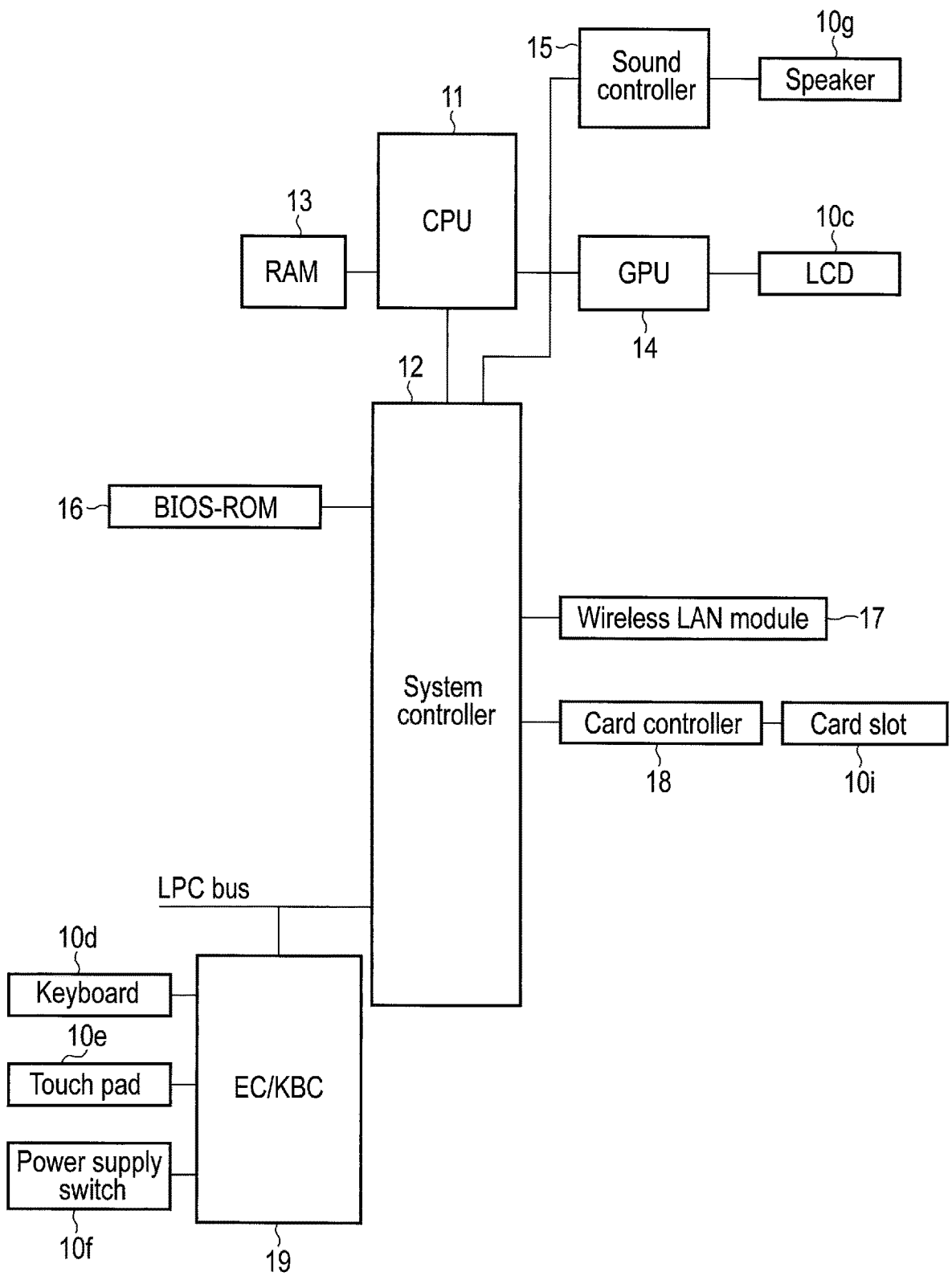
F I G. 2

ELECTRONIC APPARATUS AND METHOD FOR OPERATING A VIRTUAL DESKTOP ENVIRONMENT FROM NONVOLATILE MEMORY

CROSS-REFERENCE TO RELATED APPLICATIONS

This application is based upon and claims the benefit of priority from Japanese Patent Application No. 2015-253855, filed Dec. 25, 2015, the entire contents of which are incorporated herein by reference.

FIELD

Embodiments described herein relate generally to an electronic apparatus and a method.

BACKGROUND

In recent years, leakage of information from a stolen or lost electronic apparatus has become an issue. To be more specific, the issue has arisen that if an electronic apparatus such as a personal computer is stolen or lost, information is also stolen from the stolen or lost electronic apparatus.

Thus, companies, enterprises and the like, which are required to strictly manage information, are considering whether or not to introduce thin client (zero client) systems in which electronic apparatuses (client terminals) for use by employees are operated under a virtual desktop environment.

In the thin client system, a server apparatus solely manages resources such as various software and data, thereby enabling electronic apparatuses having a requisite minimum function only to be used as client terminals. If such an electronic apparatus is used, and then even if it is stolen or lost, the risk that information leakage will occur is low.

In the case where such an electronic apparatus as described above is operated under a virtual desktop environment, client software (and a requisite minimum operating system) for causing the electronic apparatus to communicate with a server apparatus which provides a virtual desktop environment needs to be launched in the electronic apparatus.

Since the client software is stored in an internal storage in the electronic apparatus, set information for connection to the server apparatus or other information may be held in the internal storage. If such an electronic apparatus is stolen or lost, it may causes information leakage.

On the other hand, in another developed thin client system, an electronic apparatus is caused to download client software each time it communicates with the server apparatus. However, the time required to download the client software varies in accordance with the size of the client software and a line speed. Thus, there is a case where the time is long, and the electronic apparatus cannot be efficiently used.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a view showing an example of a system configuration of the electronic apparatus.

DETAILED DESCRIPTION

Various embodiments will be described hereinafter with reference to the accompanying drawings.

In general, according to one embodiment, an electronic apparatus configured to operate in a virtual desktop environment is provided. The electronic apparatus includes a nonvolatile memory and a hardware processor. The nonvolatile memory is configured not to permit a user using the electronic apparatus to access the nonvolatile memory. The hardware processor is configured to download a client program for connection to a first server apparatus configured to provide the virtual desktop environment, from a second sever apparatus different from the first server apparatus, make the downloaded client program stored in the nonvolatile memory, and launch the client program stored in the nonvolatile memory in order for the electronic apparatus to receive the virtual desktop environment, in a case where the client program is stored in the nonvolatile memory.

An electronic apparatus according to an embodiment is a client terminal (thin client terminal) in a thin client system, and operates under a virtual desktop environment provided by a server apparatus which is connected to the electronic apparatus such that the server apparatus can communicate with the electronic apparatus.

The virtual desktop environment is a system for causing a desktop environment of the electronic apparatus to operate on the server apparatus. In this case, the electronic apparatus has only to have barebones such as a function of receiving a virtual desktop image from the server apparatus, and causing the virtual desktop image to be displayed on a display.

It should be noted that the electronic apparatus according to the embodiment may be provided as a clamshell device such as a notebook personal computer (PC) or a slate terminal such as a tablet computer. The following explanation is given on the assumption that the electronic apparatus is a notebook PC.

Figure 1:
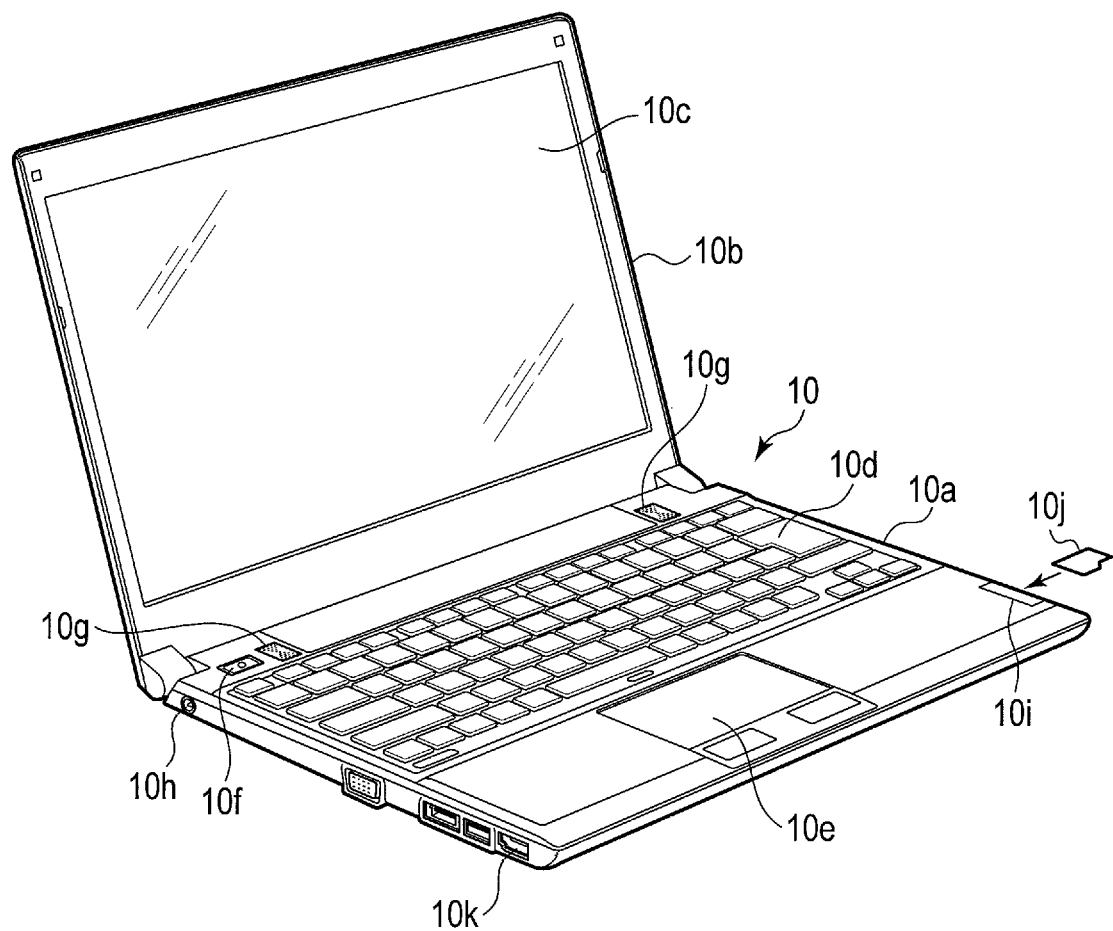
FIG. 1 is a perspective view showing an example of an appearance of an electronic apparatus according to an embodiment.

FIG. 1 is a perspective view showing an appearance of the electronic apparatus according to the embodiment. As shown in FIG. 1, the electronic apparatus 10 includes an electronic-apparatus body (computer body) 10a and a display unit 10b. In the display unit 10b, a display such as a liquid crystal display (LCD) 10c is incorporated.

The display unit 10b is attached to the electronic-apparatus body 10a in such a way as to be rotatable between an open position in which an upper surface of the electronic-apparatus body 10a is exposed to the outside and a closed position in which the upper surface of the electronic-apparatus body 10a is covered by the display unit 10b.

The electronic-apparatus body 10a has a housing formed in the shape of a thin box. On the upper surface of the electronic-apparatus body 10a, a keyboard 10d, a touch pad 10e, a power supply switch 10f, speakers 10g, etc., are provided.

Furthermore, the electronic apparatus 10 receives power from, for example, a battery (not shown) incorporated in the electronic-apparatus body 10a.

The electronic-apparatus body 10a is provided with a power supply connector (DC power supply input terminal) 10h. The power supply connector 10h is provided in a side surface, for example, a left side surface of the electronic-apparatus body 10a. To the power supply connector 10h, an external power supply device is removably connected. As the external power supply device, an AC adapter can be used. The AC adapter is a power supply device configured to convert a commercial power (AC power) into DC power.

The electronic apparatus 10 is driven by power supplied from the battery or the external power supply device. If the external power supply device is not connected to the power supply connector 10h of the electronic apparatus 10, the electronic apparatus 10 is driven by power supplied from the battery. By contrast, if the external power supply device is connected to the power supply connector 10h of the electronic apparatus 10, the electronic apparatus 10 is driven by power supplied from the external power supply device. Also, the power supplied from the external power supply device is used to charge the battery.

Furthermore, for example, in the right side surface of the electronic-apparatus body 10a, a card slot 10i is provided. The card slot 10i allows, for example, a nonvolatile memory such as an SD card (memory card), to be inserted into it. The SD card inserted in the card slot 10i is used as an external storage for the electronic apparatus 10.

In addition, in the left side surface of the electronic-apparatus body 10a, a high-definition multimedia interface (HDMI, registered trademark) output terminal 10k is provided. It should be noted that although it is omitted in FIG. 1, an USB port, an RGB port, etc., may be provided in the electronic-apparatus body 10a.

FIG. 2 shows a system configuration of the electronic apparatus 10 as shown in FIG. 1. As shown in FIG. 2, the electronic apparatus 10 includes a CPU 11, a system controller 12, a RAM (main memory) 13, a graphics processing unit (GPU) 14, a sound controller 15, a BIOS-ROM 16, a wireless LAN module 17, a card controller 18, an embedded controller/keyboard controller IC (EC/KBC) 19, etc.

The CPU 11 is a hardware processor configured to control the operation of each of components of the electronic apparatus 10. The CPU 11 executes various programs which are each developed on the RAM 13, which is a volatile memory. The programs which are executed by the CPU 11 include, for example, firmware (small core) including a basic input output system (BIOS) stored in the BIOS-ROM 16, which is a nonvolatile memory.

The system controller 12 is a bridge device configured to connect the CPU 11 and each of the components to each other. The system controller 12 executes communication with each of devices on a low PIN count (LPC) bus.

The GPU 14 is a display controller configured to control the LCD 10c, which is used as the display (monitor) of the electronic apparatus 10.

The sound controller 15 is a sound-source device, and outputs audio data to be reproduced to, for example, the speakers 10g.

The wireless LAN module 17 is configured to execute wireless communication complying with, for example, IEEE802.11.

The card controller 18 executes writing and reading data to and from the SD card 10j inserted in the card slot 10i.

The EC/KBC 19 is connected to the LPC bus. The EC/KBC 19 is a power management controller configured to exert an electric-power control of the electronic apparatus 10, and is achieved as a one-chip microcomputer incorporating a keyboard controller which controls, for example, the keyboard 10d, the touch pad 10e, etc. The EC/KBC 19 has a function of powering on or off the electronic apparatus 10 in accordance with a user's operation on the power supply switch 10f.

It should be noted that although it is omitted in FIG. 2, the electronic apparatus 10 is provided with an HDMI control circuit which is an interface configured to output, for example, an HDMI video signal and a digital audio signal, to an external monitor through the HDMI output terminal 10k.

In the embodiment, in order to prevent information leakage which will occurs in the case where the electronic apparatus 10 is, for example, stolen or lost, it is assumed that the electronic apparatus 10 does not incorporate an internal storage, for example, a hard disk drive (HDD) or a solid-state drive (SSD).

Furthermore, in the electronic apparatus 10 according to the embodiment, use of an external storage is also restricted in order to prevent information leakage as described above. In the embodiment, the electronic apparatus 10 uses the SD card 10j inserted in the card slot 10i as an external storage. However, the external storage is configured not to permit a user using the electronic apparatus 10 to access the external storage (that is, it is configured not to permit data to be read or written from or to the external storage in accordance with a user's operation).

It should be noted that the electronic-apparatus body 10a may include a USB port; however, in this case, it is assumed that in the embodiment, for example, the device which can be connected to the USB port is limited to an input device, for example, a mouse. That is, it is assumed that in the electronic apparatus 10 according to the embodiment, for example, a USB memory, cannot be used as an external storage.

The system (thin client system) including the electronic apparatus 10 according to the embodiment will be described with reference to FIG. 3.

In the embodiment, it is also assumed that the electronic apparatus 10 is used in, for example, a management area (for example, an area which needs to be strictly managed in information) of a management server apparatus (second server apparatus) 20 to be described later.

Figure 3:
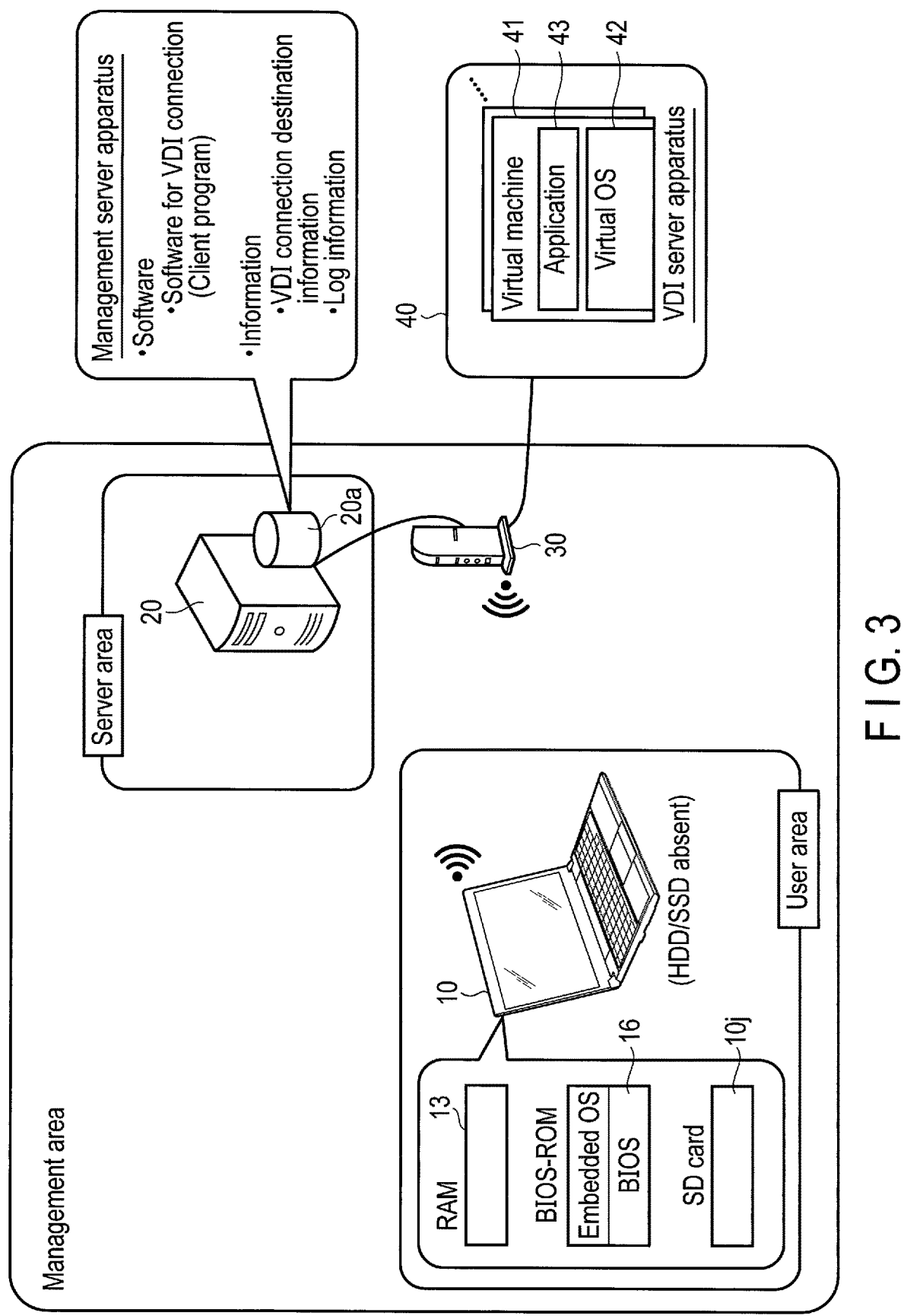
FIG. 3 is a view for explaining an example of a thin client system including the electronic apparatus.

As shown in FIG. 3, in a server area in the management area, the management server apparatus 20 is placed. A user (for example, a corporate employee) in the management area uses an electronic apparatus 10 to perform an operation. The electronic apparatus 10 can communicate with the management server apparatus 20 through a wireless network such as a wireless LAN. In this case, the electronic apparatus 10 may be connected to the management server apparatus 20 through a wireless LAN router 30. Also, through the wireless network, the electronic apparatus 10 can communicate with a server apparatus (first server apparatus) 40 configured to provide a virtual desktop environment to plural client terminals including the electronic apparatus 10.

As techniques for achieving desktop virtualization for providing a virtual desktop environment, plural kinds of techniques are present. As one of those techniques, Virtual Desk top Infrastructure (VDI) is known.

It is assumed that in the embodiment, VDI is used as a technique for achieving desktop virtualization. In this case, the server apparatus 40 functions as a VDI server apparatus configured to provide a virtual desktop environment using VDI. The electronic apparatus 10 functions as a VDI client terminal. In the following explanation, the server apparatus 40, which provides a virtual desktop environment, is referred to as a VDI server apparatus 40 as a matter of convenience.

As models which can be applied as the VDI server apparatus 40, a blade PC model, a virtual machine model, a terminal model, etc., are present. For example, in the case where the VDI server apparatus 40 is a virtual machine model, in the VDI server apparatus 40, plural virtual machines 41 are executed. One of those plural virtual machines 41 is assigned to the electronic apparatus 10. Each of the virtual machine 41 includes a virtual OS (client desktop OS) 42 and an application program 43 to be executed on the virtual OS 42. The electronic apparatus 10 may be connected to a single virtual machine 41 on the VDI server apparatus 40 through the wireless LAN router 30.

The electronic apparatus 10 according to the embodiment, as described above, does not include an internal storage, and operates using Virtual Desk top Infrastructure (VDI) of a BIOS base.

In order to achieve VDI of a BIOS base, firmware including BIOS includes a network communication function for connection to a wired or wireless network. The firmware including BIOS, as described above, is stored in the BIOS-ROM (firmware ROM) 16 in the electronic apparatus 10. The firmware includes, for example, BIOS and an embedded OS having a network communication function. BIOS can boot the embedded OS in the BIOS-ROM 16. As BIOS, UEFI BIOS may be applied. The BIOS-ROM 16 may be a flash EEPROM to allow the above firmware to be updated.

The electronic apparatus 10 can communicate with the management server apparatus 20 through the wireless network, using only the firmware in the BIOS-ROM 16.

The management server apparatus 20 has a function of limiting client terminals which can be used in the management area to a group of terminals registered in advance in order to prevent an unauthorized terminal from being used in the management area, i.e., prevent an unauthorized terminal from accessing to the VDI server apparatus 40. Also, the management server apparatus 20 has a function of providing information and a program necessary for communicating with the VDI server apparatus 40 to client terminals each of which is authenticated and identified as an authorized client terminal.

The management server apparatus 20 includes a storage 20a. The storage 20a stores software (Big Core) for VDI connection, VDI connection destination information, etc. The software for VDI connection is a client program for achieving connection to a server apparatus which provides a virtual desktop environment (i.e., the VDI server apparatus 40), and for receiving a virtual desktop image from the VDI server apparatus 40.

It should be noted that the electronic apparatus 10 can download the software for VDI connection (client program) from the management server apparatus 20. In this case, the downloaded software for VDI connection is developed and launched on the RAM 13, whereby the electronic apparatus 10 is connected to the VDI server 40, and allowed to be provided with the virtual desktop environment from the VDI server apparatus 40 (that is, it is allowed to operate under the virtual desktop environment).

Other than a method in which the software for VDI connection is downloaded from the management server apparatus 20 as described above, there can be a method in which the software for VDI connection is stored in the BIOS-ROM 16 in advance. However, in this method, it is necessary to prepare a ROM having a large capacity as the BIOS-ROM 16. Furthermore, in a structure in which a client program is stored in the BIOS-ROM 16 in advance, the kinds of client programs which can be applied are limited.

On the other hand, in a structure in which as described above, a client program is downloaded from the management server apparatus 20 into the electronic apparatus 10, it is possible to cause an arbitrary kind of client program to be executed on the electronic apparatus 10, simply by changing the kind of the client program to be stored in the storage 20a of the management server apparatus 20.

The VDI connection destination information is information necessary for connection to the VDI server apparatus 40. The VDI connection destination information may include the network address (IP address) of the VDI server apparatus 40 and qualification information (user ID and a password) to log in on the VDI server apparatus 40.

The software for VDI connection is launched to connect the electronic apparatus 10 to the VDI server apparatus 40 through the network, by the embedded OS in the firmware. In this case, the user inputs qualification information (user ID and a password) on a VDI login screen displayed on the display of the electronic apparatus 10. Thereby, the user can log in on the VDI server apparatus 40 by the software for VDI connection (client program).

After the user logs in on the VDI server apparatus 40, the electronic apparatus 10 can receive an image of a virtual desktop from the VDI server apparatus 40 through the network (the wireless network in this case), by the software for VDI connection. The image of the virtual desktop is displayed on the display (LCD 10c) of the electronic apparatus 10. Also, the electronic apparatus 10 can transmit operation information regarding an operation of the input device by the user to the VDI server apparatus 40 through the network (the wireless network in this case). The operation information regarding the input device includes information regarding an operation on the keyboard 10d, information regarding an operation on the touch pad 10e, etc.

In such a manner, the software for VDI connection is downloaded from the management server apparatus 20 into the electronic apparatus 10 by the firmware only. Therefore, the electronic apparatus 10 does not need to include an internal storage, and can thus reduce the possibility with which data and a unique program will be illegally used.

It should be noted that the firmware holds connection information (the network address of the management server apparatus 20) for connection to the management server apparatus 20. In this case, since the data amount of the connection information is small, the connection information may be stored in, for example, a trusted platform module (TPM), a specific chip, or the like, which can more reliably keep information in secrecy. Such a structure can improve the security. Furthermore, the connection information may include service set ID (SSID) of the wireless LAN router 30.

In addition, the firmware has a function of automatically powering off the electronic apparatus 10 (which will be hereinafter referred to as an automatic power-off function) if the electronic apparatus 10 is disconnected from the network (the wireless network in this case) after connection between the electronic apparatus 10 and the VDI server apparatus 40 is established. It should be noted that as described above, in the case where the electronic apparatus 10 is provided with the virtual desktop environment, the software for VDI connection needs to be developed and launched on the RAM 13. In this case, there is a case where the RAM 13 holds information which may be illegally used if it leaks from the RAM 13. However, if the electronic apparatus 10 is powered off by the above automatic power-off function, the information in the RAM 13 (which is a volatile memory) is all automatically erased. By virtue of this feature, it is possible to prevent information in the RAM 13 from leaking therefrom to the outside.

Processing for determining whether the electronic apparatus 10 has been disconnected from the network or not may be executed by the firmware (for example, the embedded OS). As a method for determining whether the electronic apparatus 10 has been disconnected from the network or not, for example, a method for determining whether or not the electronic apparatus 10 and the VDI server apparatus 40 have been released from connection (VDI connection) between them (whether they have been disconnected from each other) may be applied. Such a VDI connection release (disconnection) occurs, for example, if the electronic apparatus 10 is carried from the management area to the outside thereof (outside a communication range), or the electronic apparatus 10 logs off from the VDI server apparatus 40.

In the case where the electronic apparatus 10 is carried to the outside of the management area, not only the electronic apparatus 10 and the VDI server apparatus 40 but the electronic apparatus 10 and the management server apparatus 20 are disconnected from each other. Therefore, the electronic apparatus 10 periodically communicates with the management server apparatus 20 by the firmware, whereby it may be determined that the VDI connection release has occurred, if the electronic apparatus 10 is unable to communicate with the management server apparatus 20 for a predetermined time period or more. In the case where a GPS sensor is provided in the electronic apparatus 10, it may be determined using the GPS sensor whether the electronic apparatus 10 has been moved to the outside of the management area or not.

Suppose after the software for VDI connection downloaded from the management server apparatus 20 is developed and launched on the RAM 13 as described above, and the electronic apparatus 10 becomes operable under the virtual desktop environment, the user powers off the electronic apparatus 10 to stop use of the electronic apparatus 10. In this case, since the information in the RAM 13 is all erased as described above, the software for VDI connection needs to be re-downloaded from the management server apparatus 20 in order for the user to re-use the electronic apparatus 10 under the virtual desktop environment. In such a structure, there is a case where it takes much time to download the software for VDI connection if the software has a large size and the line speed is slow, thus reducing the convenience.

In view of the above, the embodiment is provided to have a function of caching in the above-mentioned external storage (the SD card 10j), the software for VDI connection (client program) downloaded from the management server apparatus 20 (which will be hereinafter referred to as a caching function). The caching function will be described later in detail.

Figure 4:
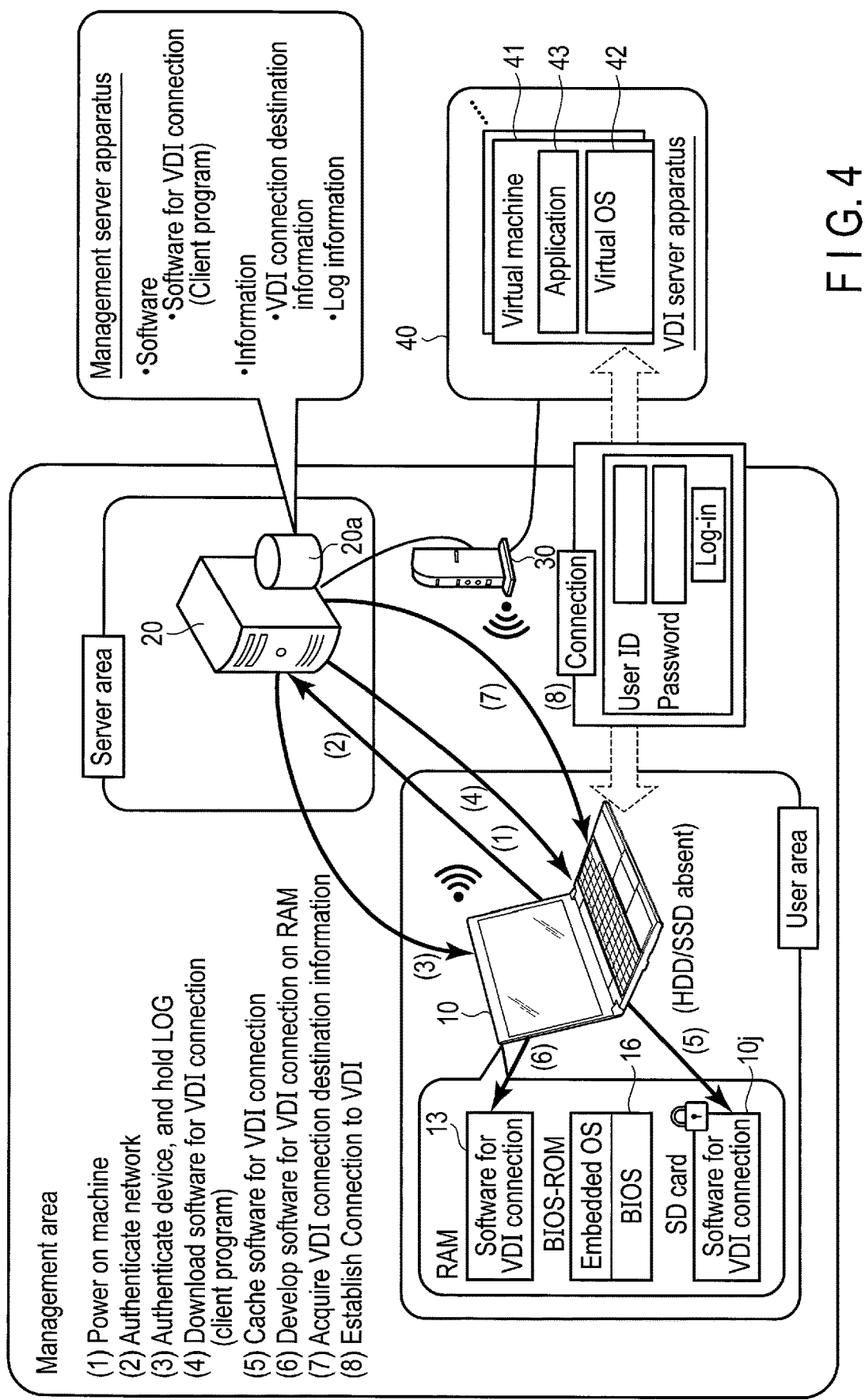
FIG. 4 is a view for explaining an outline of processing for connecting the electronic apparatus and a VDI server apparatus to each other.

Next, an outline of processing for connecting the electronic apparatus 10 and the VDI server apparatus 40 will be explained with reference to FIG. 4.

(1) The electronic apparatus 10 (machine) is powered on by a user's operation on the power supply switch 10f.

(2) The firmware in the electronic apparatus 10 is executed. Communication between the firmware and the management server apparatus 20 starts, and network authentication processing for determining whether to permit the electronic apparatus 10 to be connected to the management server apparatus 20 through the network or not is executed. If the firmware in the electronic apparatus 10 holds correct connection information (the network address of the management server apparatus 20) for connection to the management server apparatus 20, it is permitted to be connected to the management server apparatus 20 through the network (authentication in the network authentication processing has succeeded).

(3) Then, device authentication processing for preventing use of an unauthorized terminal is executed. In this case, the electronic apparatus 10 transmits to the management server apparatus 20, device information from which the electronic apparatus 10 can be identified, for example, device ID (a serial number or the like) which identifies the electronic apparatus 10 or a certificate which the electronic apparatus 10 has. In the management server apparatus 20, device information related to client terminals which can be used in the thin client system is registered in advance. The management server apparatus 20 determines whether the device information transmitted from the electronic apparatus 10 is coincident with any of the device information registered in advance or not (device authentication processing). The management server apparatus 20 stores log information indicating whether authentication in the device authentication processing has succeeded or not, in the storage 20a in the management server apparatus 20. Also, the electronic apparatus 10 may make the log information indicating whether the authentication has succeeded or not stored in the RAM 13 of the electronic apparatus 10.

(4) If the authentication in the device authentication processing has succeeded, the electronic apparatus 10 downloads the software for VDI connection (client program) from the management server apparatus 20.

(5) The electronic apparatus 10 performs the above caching function to execute processing for caching the software for VDI connection downloaded from the management server apparatus 20. In this case, the software for VDI connection is stored (cached) in the SD card 10j (the external storage), which is a nonvolatile memory not permitting the user to access it.

(6) The software for VDI connection is developed on the RAM 13 by the firmware.

(7) The electronic apparatus 10 acquires VDI connection destination information from the management server apparatus 20. In this case, the management server apparatus 20 transmits to the electronic apparatus 10, VDI connection destination information related to registered device information which is coincident with the device information from the electronic apparatus 10. The VDI connection destination information, as described above, includes the network address (IP address) of the VDI server apparatus 40. Furthermore, the VDI connection destination information may include qualification information (user ID and a password) for logging in on the VDI server apparatus 40. It should be noted that the VDI connection destination information is acquired from the management server apparatus 20 if the electronic apparatus 10 is first started. Thereafter, it is checked (determined) at the time of executing the device authentication processing whether the VDI connection destination information is present or absent, and if the VDI connection destination information is updated, it is re-acquired.

(8) The electronic apparatus 10 launches (executes) the software for VDI connection on the RAM 13 in order to connect the electronic apparatus 10 and the VDI server apparatus 40. The electronic apparatus 10 transmits a connection request (login request) to the VDI server apparatus 40, using the network address (IP address) included in the VDI connection destination information. In this case, the user inputs the user ID and password which are included in the VDI connection destination information to a user ID input field and a password input field on a VDI login screen provided by the VDI server apparatus 40. Thereby, the user can log in on the VDI server apparatus 40. If the user logs in on the VDI server apparatus 40, connection (VDI connection) between the electronic apparatus 10 and the VDI server apparatus 40 is established, and the electronic apparatus 10 can operate in the virtual desktop environment provided by the VDI server apparatus 40.

Figure 5:
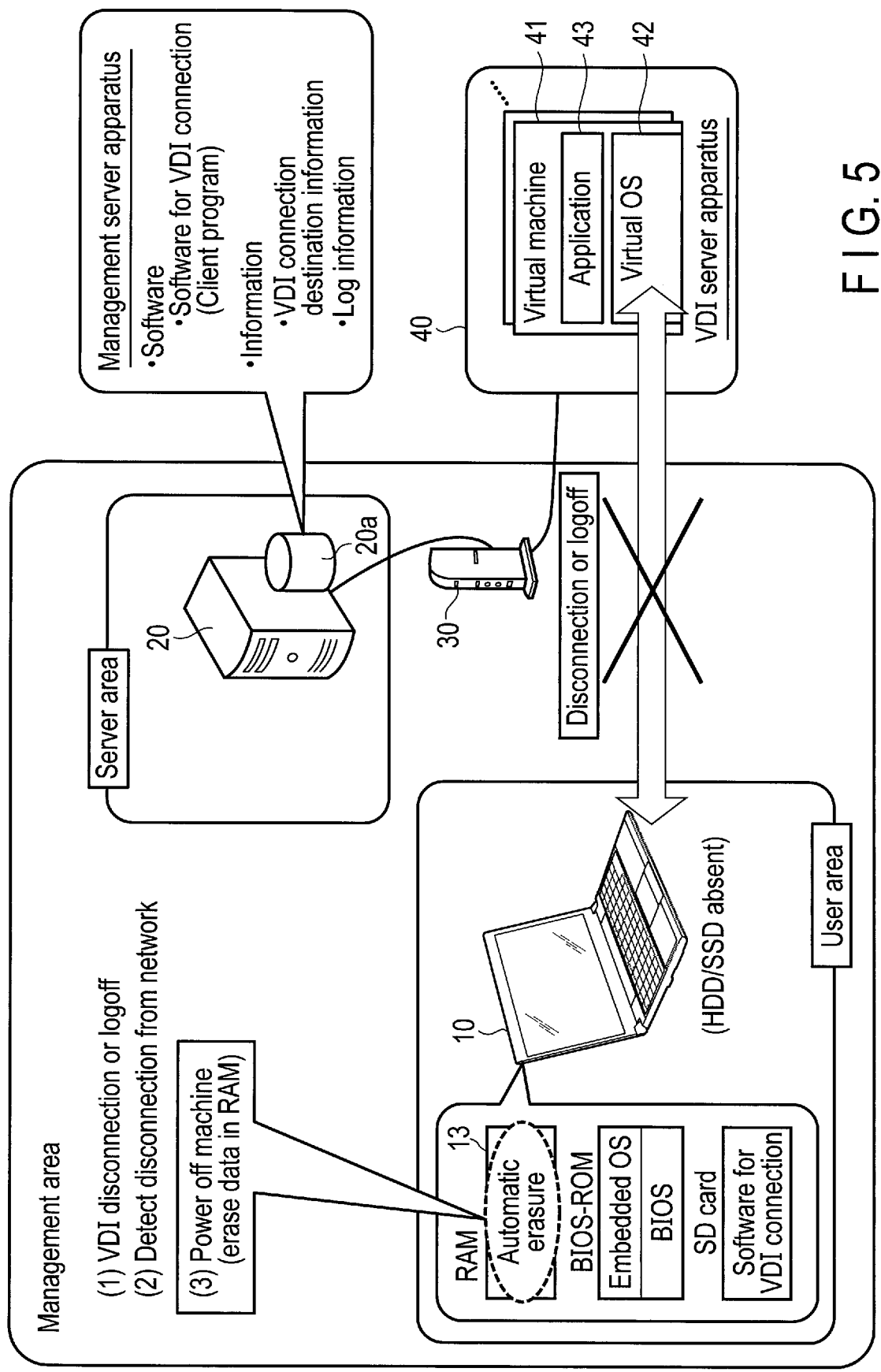
FIG. 5 is a view for explaining an outline of processing to be executed when the electronic apparatus is disconnected from a network.

Next, the outline of processing to be executed when the electronic apparatus 10 is disconnected from the network will be explained with reference to FIG. 5.

(1) For example, if the electronic apparatus 10 is carried to the outside of the management area, it is disconnected from the VDI server apparatus 40 (VDI disconnection). In this case, the electronic apparatus 10 enters a logoff state in which it is stopped to receive screen information (virtual desktop image) from the VDI server apparatus 40.

(2) The electronic apparatus 10 detects that the electronic apparatus 10 has been disconnected from the network by the firmware (for example, the embedded OS).

(3) If the electronic apparatus 10 detects that the electronic apparatus 10 has been disconnected from the network, an OFF signal (power-off command) is transmitted to a power-supply controller in the electronic apparatus 10 to power off the electronic apparatus 10, using the above-mentioned automatic power-off function. Thereby, information in the RAM 13 is automatically erased.

It should be noted that also, if the user of the electronic apparatus 10 performs a logoff operation to cause the electronic apparatus 10 to be in the logoff state, the electronic apparatus 10 may be automatically powered off.

Figure 6:
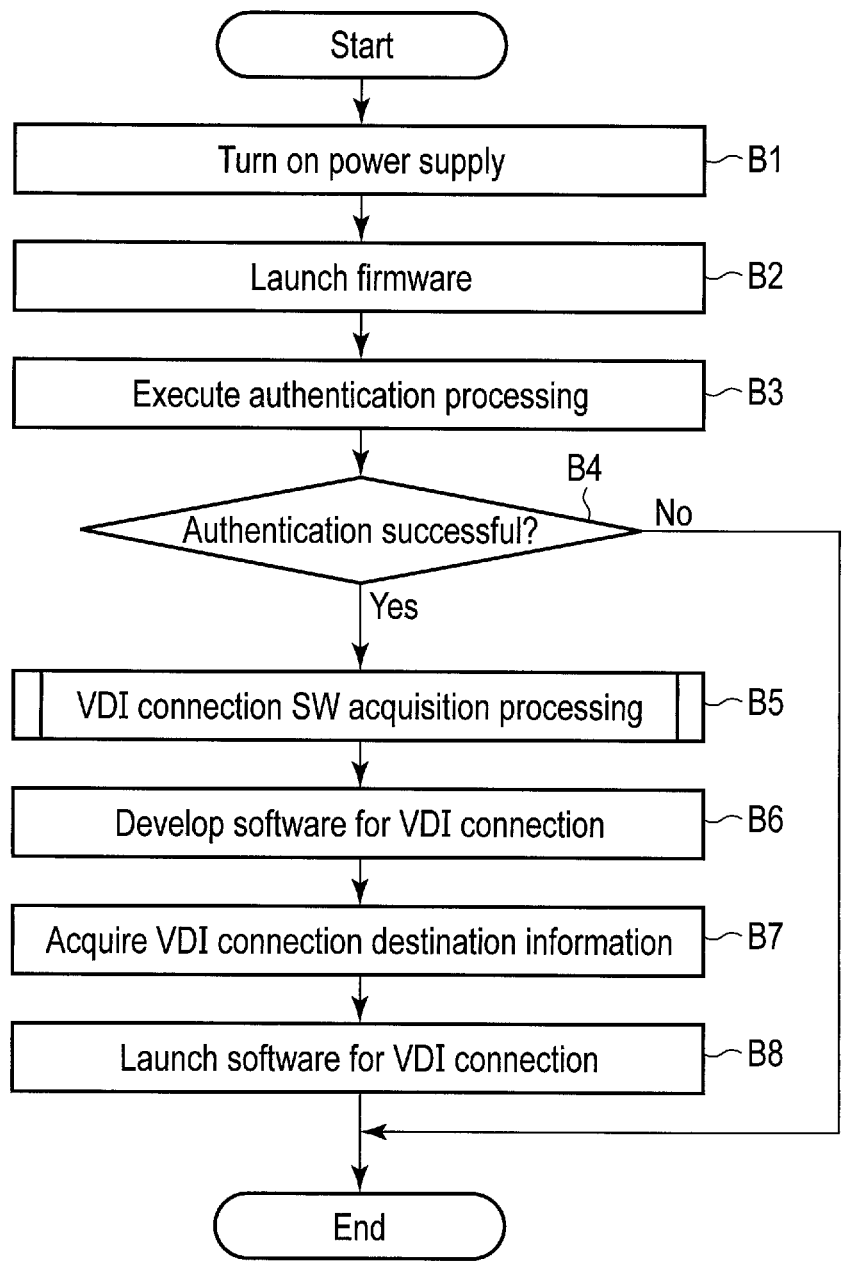
FIG. 6 is a flowchart showing an example of processing to be executed by the electronic apparatus in the case where it receives a virtual desktop environment.

The procedure of processing to be executed by the electronic apparatus 10 in the case where it is provided with a virtual desktop environment (i.e., it is connected to the VDI server apparatus 40) will be explained with reference to FIG. 6. It should be noted that the processing as shown in FIG. 6 is executed each time the electronic apparatus 10 is powered on.

First, for example, if the user presses the power supply switch 10f, which is provided on the upper surface of the electronic-apparatus body 10a, an ON signal (power-on command) is transmitted to the power-supply controller in the electronic apparatus 10 to power on the electronic apparatus 10 (block B1).

If the electronic apparatus 10 is powered on, the firmware (the embedded OS included therein) in the BIOS-ROM 16 is launched on the electronic apparatus 10 (block B2).

Authentication processing is executed between the embedded OS and the management server apparatus 20 (block B3). The authentication processing to be executed in block B3 includes, for example, the above network authentication processing and device authentication processing.

The electronic apparatus 10 confirms the result of the authentication processing, and it is determined whether authentication of the electronic apparatus 10 has succeeded or not (block B4).

If it is determined that the authentication of the electronic apparatus 10 has not succeeded (it has failed), it transmits a request for powering off the electronic apparatus 10 to the BIOS. As a result, the BIOS transmits an OFF signal to the power-supply controller in the electronic apparatus 10. In this case, the electronic apparatus 10 is powered off to end the processing.

By contrast, if it is determined that the authentication of the electronic apparatus 10 has succeeded (YES in block B4), it executes processing for acquiring the software for VDI connection (which will be hereinafter referred to as VDI connection SW acquisition processing) (block B5).

In the case where the software for VDI connection is cached in the SD card 10j by the above caching function, in the VDI connection SW acquisition processing, the software for VDI connection is acquired from the SD card 10j. On the other hand, if the software for VDI connection is not cached in the SD card 10j, in the VDI connection SW acquisition processing, the software for VDI connection is downloaded from the management server apparatus 20. It should be noted that a detailed explanation of the VDI connection SW acquisition processing will be given later.

It is assumed that as described above, if the authentication of the electronic apparatus 10 has succeeded, the electronic apparatus 10 acquires (receives) from the management server apparatus 20, a policy (set file) defining stipulations made by an administrator or the like for the management server apparatus 20. This policy includes, for example, set information regarding the above caching function (whether the caching function is available or unavailable), a file name of the software for VDI connection (for example, the newest software for VDI connection) downloaded from the management server apparatus 20. The policy acquired from the management server apparatus 20 is held in the electronic apparatus 10 (for example, in the firmware). Therefore, although it is not necessary to acquire the policy each time the processing as shown in FIG. 6 is executed, in the case where the policy is updated in the management server apparatus 20, it is re-acquired by the electronic apparatus 10 (that is, the policy held in the electronic apparatus 10 is updated).

The software for VDI connection acquired in the VDI connection SW acquisition processing in block B5 is developed on the RAM 13 (block B6).

Furthermore, the electronic apparatus 10 communicates with the management server apparatus 20 to acquire from the management server apparatus 20, VDI connection destination information including qualification information for connection to the VDI server apparatus 40 (block B7).

The software for VDI connection is launched on the RAM 13 to connect the electronic apparatus 10 and the VDI server apparatus 40 (the virtual machine 41 on the VDI server apparatus 40) to each other (block B8).

The qualification information included in the VDI connection destination information is input on the VDI login screen, to automatically log in on the VDI server apparatus 40.

It should be noted that although it is explained that the authentication processing to be executed in block B3 includes the network authentication processing and the device authentication processing, it may further include, for example, authentication processing (hereinafter referred to as personal authentication processing) for determining whether or not the user of the electronic apparatus 10 is a right user registered in the electronic apparatus 10 in advance. The personal authentication processing may be processing for determining whether, for example, an input fingerprint, is identical to a fingerprint registered in advance in the electronic apparatus 10 or not, or processing for determining whether personal information read from an NFC card is identical to personal information registered in advance in the electronic apparatus 10 or not.

Next, with reference to the flowchart of FIG. 7, the procedure of the above VDI connection SW acquisition processing will be explained.

It is assumed that in the case where the VDI connection SW acquisition processing is executed, the policy acquired from the management server apparatus 20 when the authentication of the electronic apparatus 10 has succeeded is held in the electronic apparatus 10.

In the VDI connection SW acquisition processing, it is determined whether the caching function is available or not (block B11). The determination processing of block B11 is executed based on set information regarding the caching function, which is included in the policy held in the electronic apparatus 10.

If it is determined that the caching function is available (YES in block B11), mount processing of the SD card 10j is executed. The mount processing is processing for enabling the electronic apparatus 10 to recognize the SD card 10j (mounted state). After the mount processing, it is determined whether mounting of the SD card 10j has succeeded (i.e., the SD card 10j is in the mounted state) or not (block B12).

In the case where it is determined that mounting of the SD card 10j has succeeded (YES in block B12), it is determined whether the software for VDI connection is stored (cached) in the SD card 10j (i.e., the software for VDI connection is present in the SD card 10j) or not (block B13).

If it is determined that the software for VDI connection is not present in the SD card 10j (NO in block B13), the electronic apparatus 10 communicates with the management server apparatus 20 to download the software for VDI connection (download package) from the management server apparatus 20 (block B14).

It is assumed that in the embodiment, the software for VDI connection downloaded from the management server apparatus 20 is encrypted with a common key in a common-key encryption method (for example AES256). Also, it is assumed that a common key for use in decrypting the software for VDI connection encrypted according the common-key encryption method is delivered in advance to each of client terminals (electronic apparatuses 10) which can be used in the thin client system. The encrypted software for VDI connection may be further protected by, for example, zip with a password (120 bits). The password, as well as the common key, may be delivered to the electronic apparatus 10 in advance, or the user of the electronic apparatus 10 may be notified of the password in advance.

Therefore, using the key delivered in advance to the electronic apparatus 10, processing for decrypting the software for VDI connection (the encrypted software for VDI connection) downloaded from the management server apparatus 20 is executed. It should be noted that during the download processing in block B14 and the processing for decrypting the software for VDI connection, on the display of the electronic apparatus 10, for example, an image (splash screen) indicating that the software for VDI connection is being downloaded is displayed.

Next, after the processing for decrypting the software for VDI connection, it is determined whether decryption of the software for VDI connection has succeeded (the software for VDI connection has been decrypted) or not (block B15).

If it is determined that decryption of the software for VDI connection has succeeded (YES in block B15), the software for VDI connection is cached in the SD card 10j being in the mounted state in the electronic apparatus 10; however, if the software for VDI connection is cached as it is, there is a possibility that if the electronic apparatus 10 is stolen or lost, the software for VDI connection in the SD card 10j may be wrongfully used.

In view of the above, in the embodiment, the decrypted software for VDI connection is re-encrypted and it is cached in the SD card 10j. In this case, the software for VDI connection is encrypted using a key (hereinafter referred to as a device-dependent key) prepared based on information (device information) inherent to the electronic apparatus 10. It should be noted that the device-dependent key is, for example, a common key in the common-key encryption method. For example, it is assumed that the device-dependent key is prepared in advance, for example, in the case where the electronic apparatus 10 is registered in advance as a client terminal usable in the thin client system, and the device-dependent key is then held in the electronic apparatus 10. To be more specific, client terminals usable in the thin client system hold respective device-dependent keys.

In this case, it is determined whether encryption of the software for VDI connection using the device-dependent key has succeeded (the software for VDI connection has been encrypted) or not (block B16).

If it is determined that the encryption of the software for VDI connection has succeeded (Yes in block B16), processing for caching the encrypted software for VDI connection (i.e., for storing it in the SD card 10j) is executed. After this processing, it is determined whether caching of the software for VDI connection has succeeded or not (block B17).

If it is determined that the caching of the software for VDI connection has succeeded (YES in block B17), processing for reading the software for VDI connection from the SD card 10j is executed. Thereby, it is determined whether reading of the software for VDI connection has succeeded (i.e., the software for VDI connection has been read from the SD card 10j) or not (block B18).

Suppose it is determined that reading of the software for VDI connection has succeeded (YES in block B18). In this case, the software for VDI connection read from the SD card 10j has been encrypted using the device-dependent key as described above. Therefore, processing for decrypting the software for VDI connection is executed using the device-dependent key held in the electronic apparatus 10.

In this case, it is determined whether decryption of the software for VDI connection has succeeded (i.e., the software for VDI connection has been encrypted) or not (block B19).

If it is determined that decryption of the software for VDI connection has succeeded (YES in block B19), unmount processing for unmounting the SD card 10j is executed. The unmount processing is processing for releasing the SD card 10j from the mounted state. If the SD card 10j is unmounted (the SD card 10j is released from the mounted state), the electronic apparatus 10 does not recognize the SD card 10, as a result of which in the electronic apparatus 10, it is not possible to write or read data to or from the SD card 10j. To be more specific, in the electronic apparatus 10 according to the embodiment, only in a limited period during the VDI connection SW acquisition processing, the SD card 10j (that is, the external storage) is made available.

After the unmount processing, it is determined whether unmounting of the SD card 10*j* has succeeded or not (block B20).

If it is determined that unmounting of the SD card 10*j* has succeeded (YES in block B20), the software for VDI connection decrypted using the device-dependent key is acquired as described above (block B21). The software for VDI connection acquired in block B21 is developed on the RAM 13 in block B6 shown in FIG. 6 to be launched.

It should be noted that during the processing of blocks B16 to B20, on the display of the electronic apparatus 10, for example, an image (splash screen) indicating that the software for VDI connection is in a cached state is displayed.

If as described above, the software for VDI connection is not cached in the SD card 10*j*, the software for VDI connection downloaded from the management server apparatus 20 is encrypted and cached in the SD card 10*j*. In other words, the electronic apparatus 10 according to the embodiment has a function of using an area in the SD card 10*j* as a BIOS extended area (which will be hereinafter referred to as a BIOS-area extension function).

Figure 8:
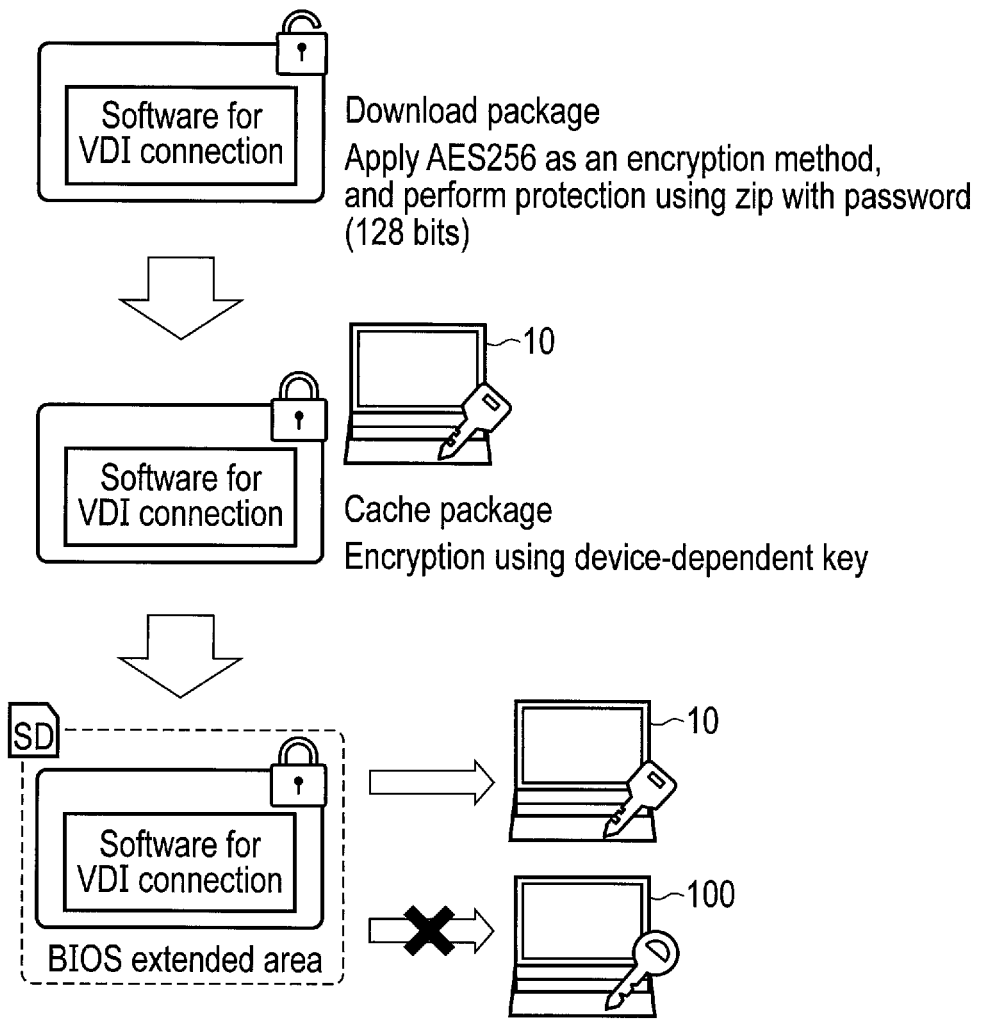
FIG. 8 is a view for explaining a function of extending a BIOS area.

The BIOS-area extension function will be briefly explained with reference to FIG. 8. In the embodiment, as shown in FIG. 8, the software for VDI connection (download package) protected according to an encryption method (zip with a password) such as AES256 is decrypted, and is then encrypted using the device-dependent key, to thereby produce a cache package.

In an ordinary thin client system, from a security standpoint, an external storage such as the SD card 10*j* cannot be used. On the other hand, in the embodiment, the above cache package (the software for VDI connection encrypted using the encrypted device-dependent key) is produced, thereby enabling the SD card 10*j* to be used as a BIOS extended area (cache area), and the cache package to be cached (stored) in the SD card 10*j*.

Suppose in the electronic apparatus 10, the cache package is cached in the SD card 10*j*, and in this state, a given person, for example, steals the electronic apparatus 10, and carries it to the outside of the management area. In this case, if the person tries to use the electronic apparatus 10, as explained above with reference to FIG. 5, the electronic apparatus 10 is automatically powered off, and information in the RAM 13 of the electronic apparatus 10 is all erased. By virtue of this feature, it is possible to prevent information in the RAM 13 from leaking therefrom to the outside.

Furthermore, for example, if the electronic apparatus 10 is carried to the outside of the management area, there is a possibility that the SD card 10*j* may be removed from the electronic apparatus 10 (the card slot 10*i* thereof), and another device 100 is used to wrongfully access the SD card 10*j* (information stored therein). However, the information stored in the SD card 10*j* is the above cache package, which can be decrypted only using the device-dependent key held in the electronic apparatus 10. That is, since the software for VDI connection cached in the SD card 10*j* in the electronic apparatus 10 can be used only in the electronic apparatus 10, even if the SD card 10*j* is inserted into another device 100, the risk that the information on the software for VDI connection (information for connection to the VDI server apparatus 40, etc.) will be stolen is low.

By virtue of the above feature, in the embodiment, the external storage such as the SD card 10*j* can be used as the BIOS extended area, while it is ensured that the risk that information leakage will occur is low (i.e., a secure state is ensured).

The above explanation is given with respect to the case where the software for VDI connection is not cached in the SD card 10*j*; however, on the other hand, in the case where the software for VDI connection (cache package) is cached in the SD card 10*j*, it is determined in block B13 that the software for VDI connection is present in the SD card 10*j* (YES in block B13). In this case, processing from block B18 onward is executed.

That is, in the case where the software for VDI connection is cached in the SD card 10*j*, the software for VDI connection is acquired from the cache package (VDI connection encrypted using the device-dependent key) stored (cached) in the SD card 10*j*. Thereby, the software for VDI connection does not need to be downloaded from the management server apparatus 20 each time the electronic apparatus 10 is powered on (the virtual desktop environment is provided). The software for VDI connection can be efficiently acquired and launched.

Figure 7:
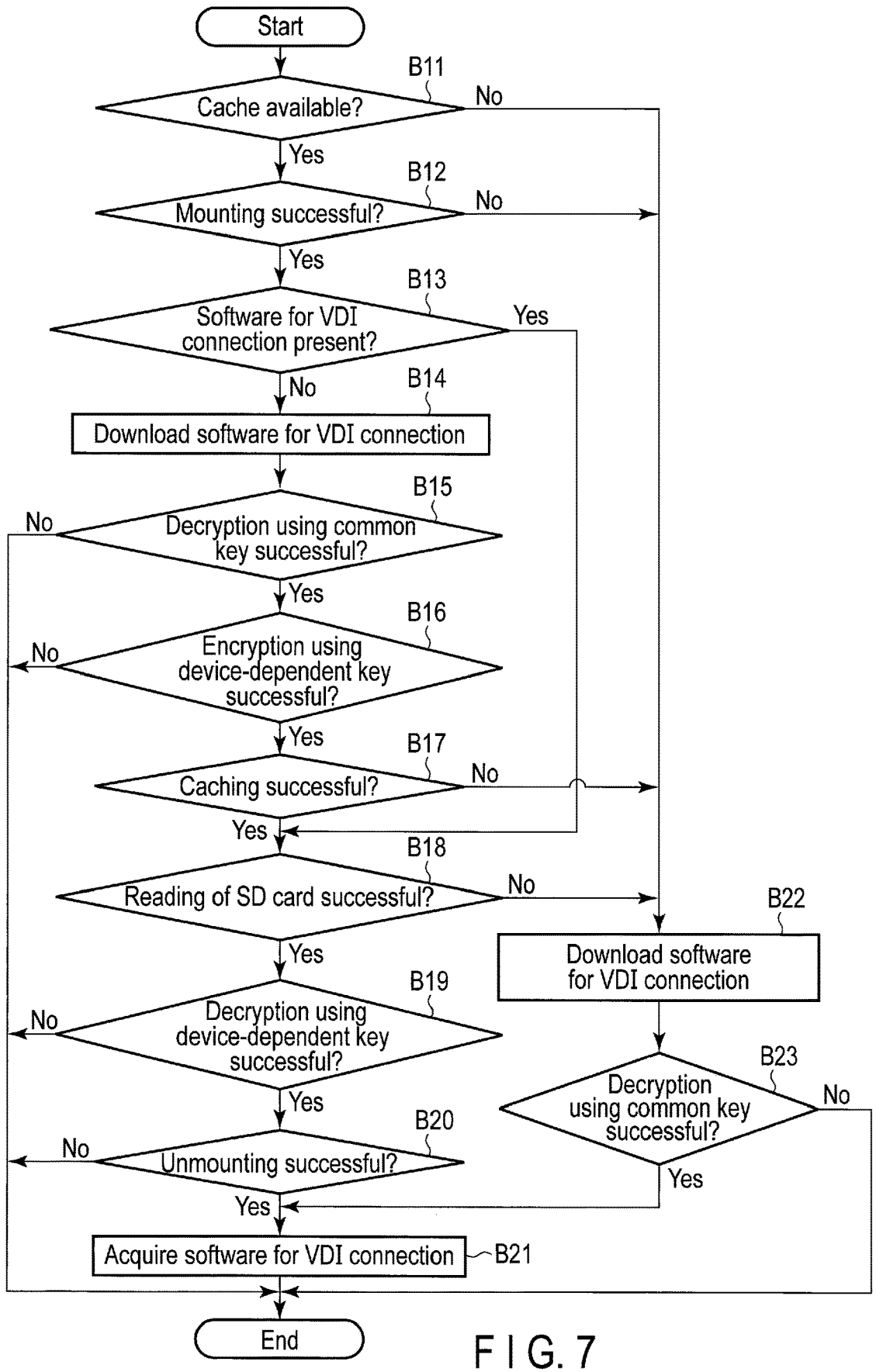
FIG. 7 is a view for explaining an example of a procedure of processing for acquiring SW for VDI connection.

It should be noted that in block B11 shown in FIG. 7, if it is determined that the caching function is not available (NO in block B11), and if in block B12, it is determined that mounting of the SD card 10*j* has not succeeded (No in block B12), processing of blocks B22 and B23, which is equivalent to that of blocks B14 and B15, is executed. In the processing of block B23, if it is determined that decryption of the software for VDI connection has succeeded (YES in block B23), the processing of block B21 is executed.

By virtue of this feature, even if the caching function is not available (i.e., it is made unavailable), or even in the case where the SD card 10*j* cannot be mounted because of, for example, an error of HW, the software for VDI connection can be acquired from a download package downloaded from the management server apparatus 20.

Furthermore, suppose in block B15, it is determined that decryption of the software for VDI connection has not succeeded (NO in block B15). In this case, there is a possibility that no common key may be present in the electronic apparatus 10 (i.e., the electronic apparatus 10 is not registered as an available client in the thin client system), and the VDI connection SW acquisition processing is thus ended. In this case, for example, the electronic apparatus 10 is powered off (i.e., the system is ended).

Similarly, in block B16, if it is determined that encryption of the software for VDI connection has not succeeded (NO in block B16), there is a possibility that no device-dependency key may be present in the electronic apparatus 10. Thus, the VDI connection SW acquisition processing is ended, and the electronic apparatus 10 is powered off.

Furthermore, in block B19, if decryption of the software for VDI connection has not succeeded (NO in block B19), there is a possibility that the device-dependent key in the electronic apparatus 10 may be different from a key for use in caching the software for VDI connection in the SD card 10*j* (that is, the SD card 10*j* may be used in another device). Thus, the VDI connection SW acquisition processing is ended, and the electronic apparatus 10 is powered off.

In block B20, if it is determined that unmounting of the SD card 10*j* has not succeeded (NO in block B20), the SD card 10*j* is kept in the mounted state (that is, data is kept allowed to be written to or read from the SD card 10*j*). Since this may cause information leakage, the VDI connection SW acquisition processing is ended, and the electronic apparatus 10 is powered off.

Furthermore, for example, in block B16, even in the case where it is determined that encryption of the software for VDT connection has succeeded, if writing to the SD card 10*j* is disabled, or if the software for VDI connection (cache package) cannot be stored (cached) in the SD card 10j because of shortage of the capacity of the SD card 10j, it is determined in block B17 that caching of the software for VDI connection has not succeeded (NO in block B17). In this case, processing from block B22 onward is executed. Thereby, although the software for VDI connection cannot be cached in the SD card 10j, the software for VDI connection can be acquired from the download package downloaded from the management server apparatus 20. The same is true of the case where in block B18, it is determined that reading of the software for VDI connection has not succeeded because of damage of the SD card 10j or the like.

It should be noted that it is explained above that in block B13 shown in FIG. 7, it is determined whether the software for VDI connection is present in the SD card 10j or not; however, even in the case where the software for VDI connection is present (cached) in the SD card 10j, if the software for VDI connection has been updated in the management server apparatus 20 (that is, the software for VDI connection in the SD card 10j is not the same as the software for VDI connection in the management server apparatus 20), it is determined that the software for VDI connection is not present in the SD card 10j. It is assumed that it is determined whether the software for VDI connection in the SD card 10j is the same as that in the management server apparatus 20 or not, by comparing the file name of the software for VDI connection in the SD card 10j and the file name included in the above policy (the file name of the latest software for VDI connection) with each other.

If the software for VDI connection in the SD card 10j is not the same as that in the management server apparatus 20, the newest software for VDI connection in the management server apparatus 20 (i.e., the updated software for VDI connection) is downloaded into the electronic apparatus 10, and the software for VDI connection stored (cached) in the SD card 10j is overwritten with the updated software for VDI connection.

Furthermore, it is explained above that in the processing as shown in FIG. 7, the common-key encryption method is applied to encryption and decryption of the software for VDI connection; however, another encryption method may be applied to the above encryption and decryption.

As described above, in the embodiment, the software for VDI connection (client program) for connection to the VDI server apparatus (first server apparatus) 40 which provides a virtual desktop environment is downloaded from the management server apparatus (second server apparatus) 20, and the downloaded software for VDI connection is stored in an external storage (for example, the SD card 10j) which does not permit the user to access thereto. Furthermore, in order to receive a provided virtual desktop environment, the software for VDI connection stored in the SD card 10j is launched. It should be noted that in this case, the software for VDI connection is encrypted and stored in the SD card 10j. Also, the firmware for downloading the software for VDI connection from the management server apparatus 20 (i.e., for connection to the management server apparatus 20) is stored in the BIOS-ROM 16 in advance.

In the embodiment, by virtue of the above structure, the SD card 10j (an area therein) which does not permit the user to access thereto is used as a BIOS extended area, and an encrypted software for VDI connection can be cached in the SD card 10j. Accordingly, the SD card 10j does not store information which may leak, except the encrypted software for VDI connection. Thus, in the thin client system, the SD card 10j (external storage) can be used in its secure state, thus reducing the risk that information may leak from the electronic apparatus 10. Furthermore, in the case where the software for VDI connection is stored (cached) in the SD card 10j when the electronic apparatus 10 is powered on, it is not necessary to download the software for VDI connection. Thus, the electronic apparatus 10 can be launched at a higher speed (the electronic apparatus 10 can be more efficiently used), as compared with the case where the software for VDI connection is downloaded each time the software for VDI connection is connected to the VDI server apparatus 40 (that is, a virtual desktop environment is received).

Furthermore, in the embodiment, the software for VDI connection is encrypted using a key (device-dependent key) prepared based on information (device information) inherent to the electronic apparatus 10. By virtue of this feature, in the embodiment, for example, even if a SD card 10j, which was inserted and used in the electronic apparatus 10, is inserted in another device, it is possible to prevent the software for VDI connection (information stored therein) from being wrongfully used, since the software for VDI connection stored in the SD card 10j cannot be used (decrypted) in the above other device.

Also, in the embodiment, if the electronic apparatus 10 is powered on, the SD card 10j is made in the mounted state, and the software for VDI connection stored in the SD card 10j is decrypted in order that the software for VDI connection be launched; and if the software for VDI connection is decrypted, the SD card 10j is released from the mounted state. In the embodiment, by virtue of such a structure, the SD card 10j is made available only in a limited period in which the software for VDI connection stored (cached) in the SD card 10j is used; and the SD card 10j is used only in the thin client system, whereby it is possible to prevent, for example, the user, from storing information which may cause information leakage in the SD card 10j, and thus prevent leakage of the information.

Also, in the embodiment, in the case where the software for VDI connection has been updated in the management server apparatus 20, it is possible to download the updated software for VDI connection, and overwrite the software for VDI connection stored (cached) in the SD card 10j with the updated software for VDI connection. In the embodiment, by virtue of such a structure, even in the case where the software for VDI connection has been updated in the management server apparatus 20, the electronic apparatus 10 can be connected to the VDI server apparatus 40 using the updated software for VDI connection.

Furthermore, in the embodiment, if the electronic apparatus 10 and the VDI server apparatus 40 are disconnected from each other after the software for VDI connection stored (cached) in the SD card 10j is developed and launched on the RAM 13, the electronic apparatus 10 is powered off. It should be noted that the RAM 13 is a volatile memory, and thus if the electronic apparatus 10 is powered off, information in the RAM 13 is automatically erased. By virtue of such a structure, for example, even if the electronic apparatus 10 is carried to the outside of an area (management area) in which it can communicate with the VDI server apparatus 40, it is possible to prevent leakage of information in the RAM 13 in the electronic apparatus 10.

It should be noted that although it is explained above that in the embodiment, the SD card 10j (an area therein) is used as an external storage serving as a BIOS extended area, another external storage (for example, eMMc or USB memory) may be used as the BIOS extended area, instead of the SD card 10j.

In addition, for example, an internal storage (an area therein) may be used as the BIOS extended area, instead of the external storage, as long as it is a nonvolatile memory which cannot be accessed by the user. In such a manner, in the case where an internal storage which does not permit the user to access is used as the BIOS extended area, there is little possibility that information in the internal storage will leak therefrom. Thus, the software for VDI connection stored (cached) in the internal storage may be configured such that it will not be encrypted.

Also, in the case where a nonvolatile memory other than the SD card 10*j* is used as the BIOS extended area, it, as well as the SD card 10*j*, is used only in a limited period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus configured to operate with a virtual desktop environment without a built-in storage, the electronic apparatus comprising:

an external storage which is a nonvolatile memory configured not to permit a user to access external storage; and a hardware processor configured to execute firmware, upon powering on the electronic apparatus, the firmware including a network communication function for communicating with a first server apparatus configured to provide the virtual desktop environment and further communicating with a second server apparatus configured to manage connection to the first server apparatus, wherein the hardware processor is configured to:

based on an internal policy, determine whether a caching function exists on the electronic apparatus;

wherein when a caching function exists on the electronic apparatus, perform a mounting of the external storage and further determine whether the mounting is successful;

when the mounting is successful, the hardware processor is further configured to:

download, from the second server, connection software configured to enable the electronic apparatus to connect to the virtual desktop environment of the first server apparatus when authentication of the electronic apparatus with the second server apparatus has succeeded;

encrypt the downloaded connection software by a device-dependent key that is generated, based at least in part on inherent information of the electronic apparatus;

attempt to cache the encrypted connection software in the external storage by the device-dependent key;

determine if the external storage has caching capabilities by checking 1) if the connection software can be written to the external storage and 2) if the connection software is readable from the storage;

if the connection software is successfully cacheable, decrypt the connection software, by using the device-dependent key; and launch the connection software downloaded from the second server in the volatile memory using the device-dependent key, when it is determined that mounting of the external storage has succeeded and that the authentication of the electronic apparatus with the second server has succeeded, wherein launching involves logging in to the first server apparatus with credentials;

wherein when a caching function does not exist on the electronic apparatus, mounting of the external storage is unsuccessful, caching capabilities on the electronic apparatus are disabled, or reading of the downloaded connection software is unsuccessful, the hardware processor is further configured to:

download the connection software configured to be decrypted using a common key, the connection software enabling the electronic apparatus to connect to the virtual desktop environment of the first server apparatus, when authentication of the electronic apparatus with the second server apparatus has succeeded;

develop, by the executing firmware, the connection software on the volatile memory included in the electronic apparatus; and launch the connection software downloaded from the second server apparatus on the volatile memory, using the common key, when it is determined that the electronic apparatus is powered on; and when the electronic apparatus is disconnected from the first server apparatus after connection between the electronic apparatus and the first server apparatus is established, the firmware erases data in the volatile memory.

2. The electronic apparatus of claim 1, wherein the hardware processor is configured to:

perform a process for causing the external storage to be in a mounted state for enabling the electronic apparatus to recognize the external storage, when the electronic apparatus is powered on;

decrypt the connection software by using the device-dependent key to launch the connection software, when it is determined that mounting of the external storage has succeeded and it is determined that the connection software is cached in the external storage; and release the external storage from the mounted state to enable the external storage to be unrecognized when the decryption of the connection software has been succeeded.

3. The electronic apparatus of claim 1, wherein the hardware processor is configured to:

download, when the connection software is cached in the external storage and the connection software is updated in the second server apparatus, the updated connection software from the second server apparatus; and overwrite the updated connection software on the connection software cached in the external storage.

4. The electronic apparatus of claim 1, wherein when the connection software downloaded from the second server apparatus is encrypted by a common key, the hardware processor is configured to:

decrypt the encrypted connection software by a common key distributed to the electronic apparatus;

encrypt the decrypted connection software again by the device-dependent key and store the connection software to be cached in the external storage; and decrypt the connection software cached in the external storage by the device-dependent key; and develop the connection software; and launch the connection software on the volatile memory.

5. A method to be executed by an electronic apparatus configured to operate with a virtual desktop environment without comprising a built-in storage, the electronic apparatus comprising:

an external storage which is a nonvolatile memory configured not to permit a user to access the external storage; and a hardware processor configured to execute firmware, upon powering on the electronic apparatus, the firmware including a network communication function for communicating with a first server apparatus configured to provide the virtual desktop environment and further communicating with a second server apparatus configured to manage connection to the first server apparatus, the method comprising:

based on an internal policy, determining whether a caching function exists on the electronic apparatus;

wherein when a caching function exists on the electronic apparatus, performing a mounting of the external storage and further determine whether the mounting is successful;

when the mounting is successful, the method performing further steps comprising:

downloading, from the second server, connection software configured to enable the electronic apparatus to connect to the virtual desktop environment of the first server apparatus when authentication of the electronic apparatus with the second server apparatus has succeeded;

encrypting the downloaded connection software by a device-dependent key that is generated, based at least in part on inherent information of the electronic apparatus;

attempting to cache the encrypted connection software in the external storage by the device-dependent key;

determining if the external storage has caching capabilities by checking 1) if the connection software can be written to the external storage and 2) if the connection software is readable from the storage;

if the connection software is successfully cacheable, decrypting the connection software, by using the device-dependent key; and launching the connection software downloaded from the second server in the volatile memory using the device-dependent key, when it is determined that mounting of the external storage has succeeded and that the authentication of the electronic apparatus with the second server has succeeded, wherein launching involves logging in to the first server apparatus with credentials;

wherein when a caching function does not exist on the electronic apparatus, mounting of the external storage is unsuccessful, caching capabilities on the electronic apparatus are disabled, or reading of the downloaded connection software is unsuccessful, the hardware processor is further configured to:

downloading the connection software configured to be decrypted using a common key, the connection software enabling the electronic apparatus to connect to the virtual desktop environment of the first server apparatus, when authentication of the electronic apparatus with the second server apparatus has succeeded;

developing, by the executing firmware, the connection software on the volatile memory included in the electronic apparatus; and launching the connection software downloaded from the second server apparatus on the volatile memory, using the common key, when it is determined that the electronic apparatus is powered on; and erasing data in the volatile memory, when the electronic apparatus is disconnected from the first server apparatus after connection between the electronic apparatus and the first server apparatus is established.

* * * * *